Feb. 8, 1949.   R. W. ERDLE ET AL   2,461,416
PATTERN MATERIAL, PATTERN AND METHOD
Filed Dec. 2, 1944   2 Sheets-Sheet 1
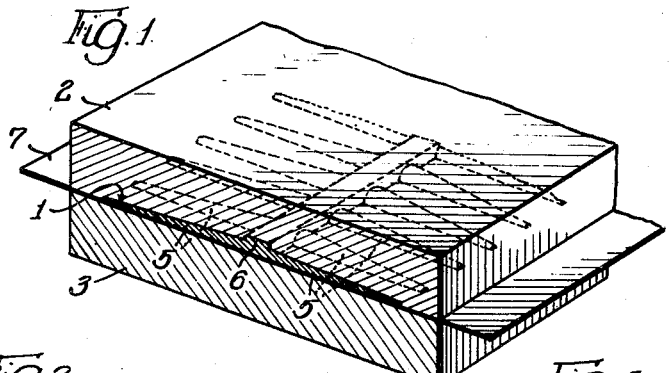
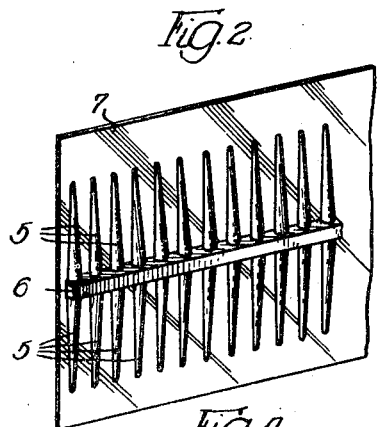
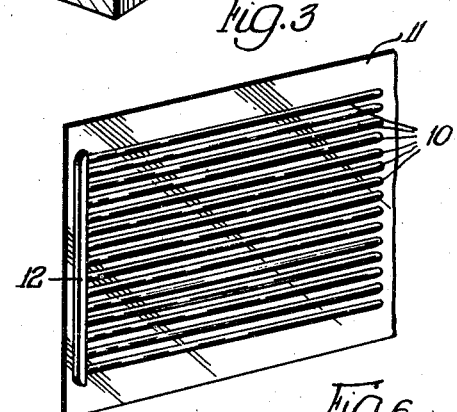
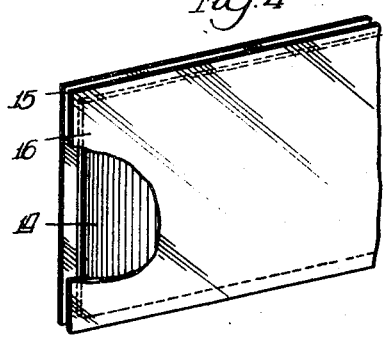
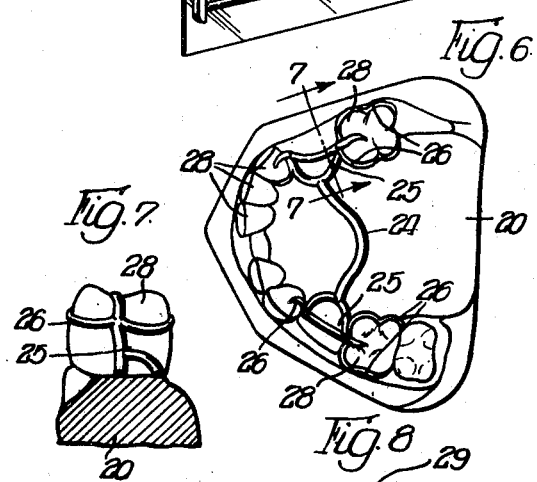
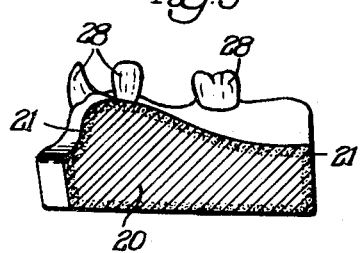
INVENTORS.
Reiner W. Erdle,
BY Charles H. Schaar,
Brown, Jackson, Boettcher & Dienner
Attys.

Feb. 8, 1949. R. W. ERDLE ET AL 2,461,416
PATTERN MATERIAL, PATTERN AND METHOD
Filed Dec. 2, 1944 2 Sheets-Sheet 2

INVENTORS.
Reiner W. Erdle,
BY Charles H. Schaar,

Patented Feb. 8, 1949

2,461,416

UNITED STATES PATENT OFFICE 2,461,416

PATTERN MATERIAL, PATTERN, AND METHOD

Reiner W. Erdle and Charles H. Schaar, Chicago, Ill., assignors to Austenal Laboratories, Incorporated, Chicago, Ill., a corporation of New York Application December 2, 1944, Serial No. 566,371

19 Claims. (Cl. 22—158)

This invention relates, in general, to the art of casting metal and alloy articles, and has particular relation to an improved pattern material, pattern, and method of forming and applying same, for example, to a refractory model.

More particularly, this invention relates to patterns which are shaped to the form of the desired casting, following which a refractory mold is formed against the pattern, the pattern eliminated by heat, and the molten metal or alloy introduced into the cavity formed by the pattern and cast to shape.

While we shall hereinafter, in connection with the drawings, describe the invention as applied in making patterns for cast metal or alloy dental restorations, it is to be understood that the invention is not limited to such use but may be employed in making patterns for producing other castings, and also patterns for molding vulcanite or synthetic resin dentures and the like.

Heretofore in making patterns of the class described, casting waxes which may be eliminated by heat have been applied to the model to form the pattern. These wax patterns have been formed, in general, by applying the wax, in sheet form and of suitable gauge, to the model, and cutting and trimming same to the desired configuration; also, by flowing the wax, in liquid state, onto the model and, through the skill of the technician, contouring it to make a pattern of the part to be cast, and by making performed wax patterns in open molds and applying same to the model.

Each of the prior schemes has objections on account of the properties of the waxes previously used as the pattern material, and each has the objection of requiring a great amount of skill and time by a skilled technician in applying and contouring the wax to make an accurate pattern of the article to be cast; also in adapting the wax to the surface of the model and keeping it so adapted and in sealing the wax to the model.

Due to the inherent characteristics of the waxes heretofore employed it has been extremely difficult to shape and maintain the shape of the patterns; also to adapt these waxes to the model in sheet form, or as preformed patterns, and to seal such patterns to the model and maintain same intimately in contact with the model. The waxes previously employed lack any pressure sensitive property, i. e., any property of combining chemically by contact with the part to which they are applied, and they lack the pressure or contact sealing and the tacky and bleeding properties of the material of the present invention. They must be sealed, for example, with a hot spatula, or by flowing hot wax along the pattern. This distorts the pattern and causes inaccuracy. Moreover, wax patterns are distorted by the pressure which is applied in adapting or conforming the same to the surface of the model. If the pattern material is loose or not in intimate contact with the model and properly sealed thereto, the desired accuracy is not obtained in the finished casting.

The waxes previously employed are not ductile or resilient. They lack the property of returning to their desired contour if distorted, for example, in applying and adapting them to the surface of the model. If distortion is present, or if the wax springs away or does not remain in intimate contact with the model, the casting will not have the desired configuration. The waxes heretofore generally used lack a property of stretching uniformly when adapted to a convex surface and compressing uniformly without wrinkling when applied to a concave surface. This is highly objectionable in precision casting work, and particularly in dental restorations where added or reduced weight or thickness along any part of the appliance may make the same objectionable from the patient's standpoint, or result in the absence of the requisite strength, flexibility, fit, or other desired properties.

With the waxes previously employed, objectionable spread of the hot wax over the refractory model also frequently occurs, particularly in establishing sealing lines and the like. This results in what are known as "sealing feathers" which are reproduced in the metal casting and require considerable time and possible sacrifice of accuracy in grinding and removing the same.

Those skilled in the art will readily recognize the difficulties encountered in forming parts such as clasps, retention bars and the like, by the flowing of hot wax. It is practically impossible correctly to form by hand a clasp of proper form and cross sectional area throughout its length. As a result, considerable time must usually be spent by a skilled operator in grinding the finished cast metal or alloy dental restoration to provide clasps of the proper design and cross sectional area throughout their length. A time-saving feature is that no heat is required, whereas with the waxes previously employed the waxers ordinarily waste about one-third of the operating time in waiting to heat the spatula repeatedly.

One of the main objects of the present invention is to provide an improved pattern material and pattern which lacks the disadvantages above set forth and other disadvantages of the waxes and wax patterns previously employed.

Another object of the invention is to provide an improved pattern material and pattern having various features of novelty and advantages, and particularly characterized by the property of being pressure or contact sensitive, the ability better to take and hold the desired shape, and the ability to be adapted and sealed to the part to which applied by the application of relatively slight pressure, or by contact, and without flowing wax along the pattern or heating the same; also by the tacky and bleeding properties, and the resilient and ductile character thereof, and the ability to stretch evenly and to return to the desired contour if distorted in adapting or pressure sealing the pattern to the model.

Another object of the invention is to provide an improved pattern material which has better flaming properties and, in fact, may, in smoothing the finished pattern, be flamed to substantially the smoothness of glass without any objectionable degree of distortion; also an improved pattern material possessing a long temperature range of flexibility and which will not crack or pull away from the model.

Another object of the invention is to provide an improved pattern material and pattern having a higher surface tension than the waxes previously employed, and which will globulize and pull into shape when heated instead of running, as where a pattern or pattern material formed of wax is heated.

Another object of the invention is to provide an improved pattern material, pattern and technique by the use of which accurate or precision castings are expeditiously produced and which require a minimum amount of finishing, grinding, or polishing.

Another object of the invention is to provide improved preformed patterns having the pressure or contact sensitive and pressure or contact sealing and other advantageous properties above set forth, and which can be applied to the model relatively quickly and by a relatively unskilled or inexperienced operator to form an accurate pattern for the cast article.

Another object of the invention is to provide as an improved pattern material and pattern a pressure or contact sensitive and pressure or contact sealing thermoplastic resinous material having the advantageous properties set forth, and other advantageous properties.

Another object of the invention is to provide an improved material for the initial dipping and coating of the refractory model which will have an affinity for the improved pattern material; also a combination of pattern material and dipping and coating material in which these materials have complementary tacks, or pressure or contact sensitive properties, and bleed together effectively to join and seal the pattern to the model or different pattern parts to each other.

Another object of the invention is to provide a method of conditioning the model so that a flexible pattern, when applied thereto, will automatically seal itself with light pressure.

Another object of the invention is to provide an improved pattern material which is tacky and with which the pattern may be made in sections and the sections may be joined by relatively slight pressure or contact, and will bleed together and become securely united.

Another object of the invention is to provide an improved material that may be interposed in sheet form, liquid form, or other form between pattern parts for joining same by contact or pressure; this aspect of the invention having particular utility in joining parts of a pattern which must be made in sections due, for example, to undercuts or the like which would prevent removal of the pattern in one piece from the die or mold.

Another object of the invention is to provide an improved pattern material which will permit waxing to the pattern without distorting same because of the higher softening temperature of the improved pattern material.

Another object of the invention is to provide for producing preformed pattern parts by compression between die or mold members or by pressure injection of the pattern material into metal dies or closed molds, and against sheet material which facilitates parting or separation of the pattern parts from the die or mold. The sheet material against which the pattern parts are thus formed is preferably of such character that the pattern parts will adhere sufficiently to this material to permit distribution and merchandising of the preformed pattern parts on such sheet material. At the same time the sheets carrying the pattern parts are of a character to permit ready stripping or removal of the pattern parts therefrom for use as desired.

Further objects and advantages of the invention will appear from the following detailed description, taken in connection with the accompanying drawings in which:

Figure 1 is a more or less diagrammatic view showing the step of forming a pattern comprising a plurality of interconnected pattern parts and embodying the present invention on a parting and carrying sheet;

Figure 2 is a fragmentary perspective view of the sheet and pattern parts of Figure 1, after removal from the die or mold means;

Figure 3 is a fragmentary perspective view showing pattern parts of other form on a similar sheet;

Figure 4 is a fragmentary perspective view showing the pattern material in sheet form between a pair of sheets;

Figure 5 is a vertical sectional view through a dental model after initial dipping and coating thereof;

Figure 6 is a top plan view of the model as shown in Figure 5, showing the manner in which the pattern is formed thereon from the pattern parts shown in Figures 2 and 3;

Figure 7 is a detail sectional view taken on the line 7—7 of Figure 6;

Figure 8 is a top plan view of the tooth shown in Figure 7, with the clasp forming pattern parts applied thereto;

Figure 9:
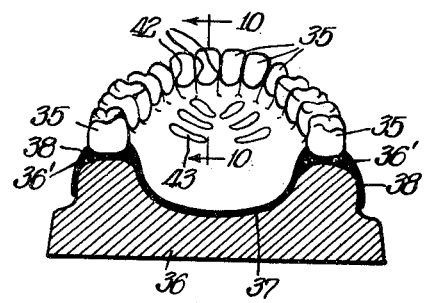
Figure 9 is a transverse vertical section through a denture model showing a palate pattern and the buccal portion of a buccal and labial pattern embodying our present invention applied thereto for molding vulcanite, synthetic resin or porcelain dentures or the like, or for forming models.

In general, the pattern material according to our invention comprises an elastoplastic material hardened or bodied with a material which has relatively high ductility, pliability, and relatively low elasticity. The elastoplastic material preferably has low, or fairly low, elasticity, but relatively high resilient nerve and tack.

One class of materials suitable for use as the pattern material of our present invention may be referred to, in general, as a modified plasticized ethyl cellulose in a resinous material. While this class of materials is capable of various modifications as will hereinafter appear, one preferred example of such pattern material is as follows:

*Pattern material—Example I*

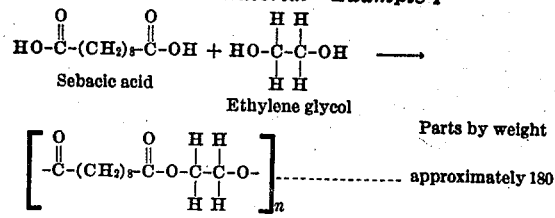

|  | Parts by weight |
| --- | --- |
| Paraplex polymer | approximately 180 |
| Technical pentaerithritol abietate butyral | approximately 150 |
| Ethyl cellulose (low viscosity) | approximately 150 |

In the above example the

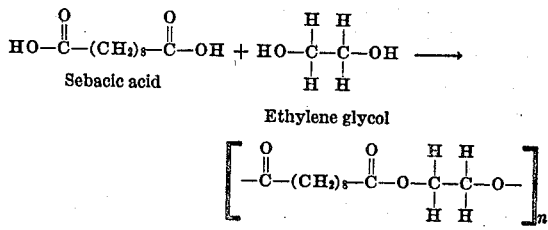

is used as the elastoplastic material. It is a rubber-like glycol ester polymer of an unsaturated acid. This material, when heated and worked, becomes soft and tacky. However, there is a reversion back to the hard non-tacky material, and therefore the technical pentaerithritol abietate butyral is added as a tackifier and plasticizer. It prevents the reversion referred to, and preserves and brings out the plasticity and tack of the elastoplastic material.

Other materials that can be used in place of the elastoplastic material above described are such materials as sol rubbers, unvulcanized natural rubber—such as low polymer synthetic rubbers, as polyvinyls, alpha polychloroprene, the polyisobutylenes, polynormalbutylenes—and all synthetic resins and elastic materials of low polymer nature such as may be classed as elastoplastic materials, preferably with a relatively high tack.

The elastoplastic and tackifier and plasticizer materials are mixed in about the proportions set forth and at a temperature from about 275° F. to about 300° F. or higher if desirable or necessary with some of the compounds hereinafter referred to. At this point we have a very soft, highly tacky material.

In order to bring this soft, tacky material to a harder or firmer state for use for the purpose of the present invention, we add a material which has low elasticity and high ductility and pliability, and, if possible, an additional tack. In Pattern material—Example I, ethyl cellulose, preferably of medium ethoxy content and low or medium viscosity preferably about 6.0–60.0 centipoises, is added for this purpose within about the range set forth, and the materials are compounded at a temperature from about 275° F. to about 300° F. or higher.

Many tackifiers and plasticizers other than technical pentaerithritol abietate butyral may be used within the scope of the present invention. Hydrogenated methyl ester rosin is another material suitable for this purpose, or dibutyl phthalate, dibutyl sebacate, tricresyl phosphate, trichlorocumene, diphenyl phthalate, chlorinated diphenyls, abietic acid esters, the low polymer cumarone, and indene resin may be used with certain elastoplastic materials of the class described. Where dibutyl phthalate is employed as the tackifier and plasticizer it may, in many cases, be the material which brings in or is used with the hardening agent in our compound or which renders the hardening agent compatible with the elastoplastic material.

If desired, about 30 parts hydrogenated methyl ester of rosin may be added to the compound set forth as Pattern material—Example I, in order to facilitate the addition of the ethyl cellulose and render it less susceptible to foam and give it greater workability in the die or molding operation. Where hydrogenated methyl ester of rosin is used it is preferably mixed with the elastoplastic and tackifier and plasticizer materials in the compounding operation and before addition of the ethyl cellulose.

Hydrogenated methyl ester of rosin is a methyl ester of hydrogenated rosin or abietic acid. This results in material which has a fairly low elasticity, high tack, moderate to high resilient nerve, pliability and ductility.

Another material which works very well for the preceding purpose can be made by swelling a chlorinated rubber, for example of about 25 to 100 centipoise viscosity, in toluene or any of the other normal swelling agents for rubber. Where such an agent as toluene or the like is employed, the material is dried, allowing the toluene or the like to evaporate, leaving the pattern material. For practical purposes it is advisable to add to the chlorinated rubber a plasticizer, such as tricresyl phosphate or dibutyl phthalate, dibutyl sebacate, trichlorocumene, diphenyl phthalate, chlorinated diphenyls, abietic acid esters, the low polymer cumarone, and indene resin, whereupon the material is injected or compressed in the die or mold means, as will be hereinafter described.

Another formula for use as the pattern material is as follows:

*Pattern material—Example II*

|  | Parts by weight |
| --- | --- |
| Ethyl cellulose | approximately 25 |
| Ester gum (preferably hydrogenated rosin) | approximately 100 |
| 25% cyclicized rubber in Micro-wax | approximately 62.5 |
| Terpene polymer resin | approximately 1.5 |
| Modified alkyd resin drop melt point 68°–75° C. | approximately 1.5 |

In the foregoing example the materials are compounded at temperatures from about 275° F. to about 300° F. or higher. The ethyl cellulose serves the same purpose as in Pattern material—Example I, but is combined with ester gum, which helps combine or compound the ethyl cellulose with the other materials. The ester gum acts as a plasticizer for the ethyl cellulose. The cyclicized rubber in Micro-wax serves as an elastoplastic material. The Micro-wax is combined with the cyclicized rubber to plasticize it; approximately 25 parts cyclicized rubber being used to about 75 parts Micro-wax. They may be combined by well known methods—for example, by milling with heat.

The terpene polymer resin is used as the tackifier for the pattern material along with the modified alkyd resin drop melt point 68°-75° C. Either of these materials may be omitted, but the combination conditions the compound so that it adheres better to the model.

In Pattern material—Example II, the ethyl cellulose and ester gum may be considered as the elastoplastic material, but the cyclicized rubber in micro-wax livens the same.

Another formula for use as the pattern material is as follows:

*Pattern material—Example III*

Parts by weight

Ethyl cellulose (preferably about 6.3 to 10.0 centipoises) _____approximately__ 25
Ester gum (preferably hydrogenated rosin)_____approximately__ 100
Maleic rosin glyceride (Amberol #800)_____approximately__ 25
Terpene polymer resin_____approximately__ 2
Modified alkyd resin drop melt point 68°-75° C_____approximately__ 2

In Pattern material—Example III, the materials are compounded at temperatures from about 275° F. to about 300° F. or higher. The ethyl cellulose and ester gum serve as the elastoplastic material. The maleic rosin glyceride serves as the hardening material. The terpene polymer resin and modified alkyd resin drop melt point 68°-75° C. together serve as the tackifier, as in Pattern material—Example II.

In the preparation of Pattern material—Example II, and Pattern material—Example III, the ethyl cellulose is dissolved in a compatible resin. The plasticizer is added to assure flexibility, softness, and, to a degree, desirable transparency. Resilience is imparted to the desired degree by the use of the rubber condensation product or cyclicized rubber preferably of medium high degree of polymerization (100,000 to 200,000 molecular D. P.). It is desirable that these products offer substantially complete compatibility with the other constituents, and to this end certain of the chlorinated rubbers (about 60 centipoise viscosity), the medium to high polyisobutylenes and the normal butyl polymers and vinyl polymers and copolymers may be substituted, plus many of the aforementioned elastoplastic materials.

The property of pressure or contact seal and the pressure or contact sensitive property and complementary contact seal are regulated by the small additions of terpene polymer resin and modified alkyd resin drop melt point 68°-75° C., in amounts from about 0.50% to about 5.0%, or by the addition, within about the range set forth, of such other tack producing materials as hydrogenated methyl ester of rosin, blown linseed oil,

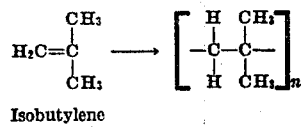

Isobutylene polyisobutylenes or combinations thereof.

If it is found desirable, after compounding the foregoing materials, further slightly to modify the toughness or hardness, any of the following ingredients may be added, generally, to the extent from about 10% to about 25% of the compound: Maleic resin glyceride, maleic glyceride of abietic acid

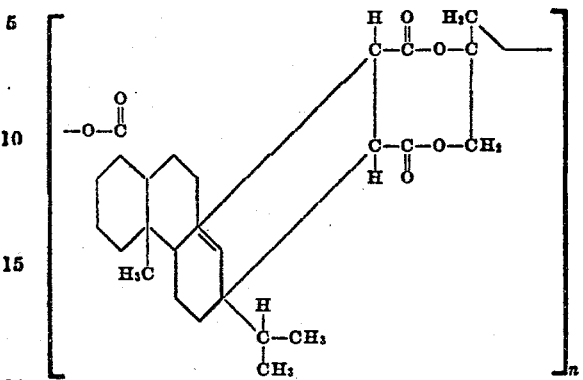

Maleic glyceride of abietic acid

We have also found that alpha polychloroprene, may be used as the elastoplastic material for purposes of our present invention.

We have also found that bituminous rubber-like substances may be used in forming the pattern material. One typical example of a material of this class is as follows:

*Pattern material—Example IV*

Parts by weight

Asphalt_____ approximately 140

Indene + Cumarone →

The resin polymer _____ approximately 23

Ceresin_____ approximately 34

Vulcanizable mixed polyhydric-alcohol ester of a resin acid and polymeric fatty acids which occur in drying or semi-drying oils substantially free from fatty acids naturally occurring in said oil_____ approximately 1½

The last mentioned formula is a typical example of a material using a bituminous rubber-like substance; in this particular instance, a pure asphalt or blown petroleum asphalt. This material inherently presents certain of the desired or requisite physical properties such as tack, flexibility, temperature range, and the pressure or contact sensitive property as well as the ability to seal by contact or relatively slight pressure.

We have found that it is possible to impart improved resiliency to this asphalt base material by the addition of one or more of a group of compatible resinous materials, such as

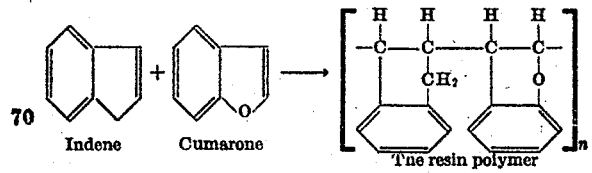

Indene    Cumarone        The resin polymer

We have also found that a small amount of Micro or paraffinic wax can be used to control the degree of tack and pressure or contact sensitive and pressure or contact sealing properties. In some instances it may be desirable further to increase the property of tackiness, and such materials as follows have been found to be of advantage in amounts from about 0.25% to about 2.0%:

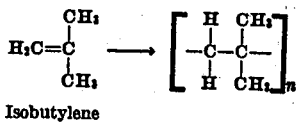

polyisobutylene (20,000 to 40,000 polymerized grade), vulcanizable mixed polyhydric-alcohol ester of a resin acid and polymeric fatty acids which occur in drying or semi-drying oils substantially free from fatty acids naturally occurring in said oil, terpene polymer resin, and $C_6H_3(OH)_6$.

There are several classes of material suitable for compounding and use in forming patterns having the requisite properties. Some of the materials which are suitable are as follows:

1. Pure petroleum asphalt
2. Blown petroleum asphalt
3. Wurtzilite asphalt
4. Fatty acid pitch
5. Ozokerite and paraffin waxes
6. Hard nature asphalts
7. Asphaltites, used alone or fluxed
8. Rosin pitch The first four of the above listed materials have the lowest ash content and, therefore, are especially suitable for the purposes of the present invention.

A typical formula for utilizing certain of these last mentioned materials is as follows:

*Pattern material—Example V*

Parts by weight

Blown petroleum asphalt (melting point about 160° F. to about 180° F. or higher) _____ approximately 140

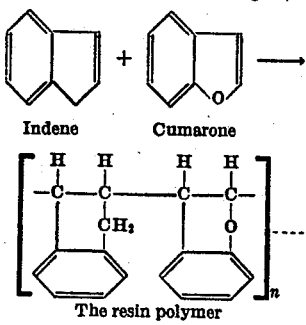

The resin polymer _____ approximately 25

Ceresin from ozokerite or a cerese or Micro-wax (melting upwards of about 150° F.) _____ approximately 34
Tackifying agent (such as polyisobutylene low polymer,

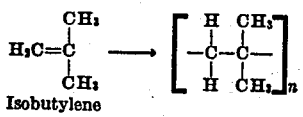

polyisobutylene terpene polymer resin, modified alkyd resin (drop melt point 68°–75° C.), or blown linseed oil _____ approximately 1.5 to 4

Wurtzilite asphalt, if obtained substantially ash free, may be substituted for the blown petroleum asphalt. Of the fatty acid pitches, we have found stearin pitch to be one of the most desirable, and this may also be substituted for the blown petroleum asphalt with a simultaneous reduction in the amount of cumar resin and the Micro-wax or cerese wax. Rosin pitch may be used as the hardening resinous material in the asphalt formula, and chlorinated naphthalenes may be similarly used.

Referring now to the drawing, the pattern material, various forms of which have been described, is formed into sheets or preformed patterns of the desired thickness, for example, by injecting or forcing the material into the cavity 1 defined by the metal die or closed mold parts 2 and 3 (Figure 1) at a temperature from about 300° F. to about 360° F. and under pressure to assure proper filling of the cavity 1 which corresponds to the casting to be made.

We also contemplate forming the pattern material into sheets or preforming the patterns or pattern parts of the materials described by compression between die or mold parts which are closed or compressed upon the material at room temperature or relatively cold.

The cavity 1 shown in Figure 1 is shaped to form a plurality of preformed patterns 5 for forming clasps for dental appliances. The clasp patterns 5 are finished on all surfaces in the die or mold parts, as are the other patterns according to the present invention. Each pattern 5 is finished to the precise tapered form for giving the finished clasp the desired resilience combined with the requisite strength and other desired properties. The patterns 5 are shown extending in opposite directions from a connecting rib 6, with the larger ends of the patterns 5 integrally interconnected by the rib 6 which is formed of the pattern material.

The preformed patterns or pattern parts and the pattern material in sheet form are preferably formed against sheet material 7 which serves as a parting means for facilitating parting or separation of the pattern or the pattern material in sheet form from the die or mold. The sheet material 7, against which the pattern or sheet of pattern material is thus formed, is preferably of such character that the preformed pattern or sheet of pattern material will adhere sufficiently to the sheet 7 to permit distribution and merchandising of the preformed pattern, pattern parts, or sheets of pattern material on the parting and carrying sheets 7. At the same time the sheet material 7 is of a character to permit ready stripping or removal of the pattern parts, sheets of pattern material, or strips cut therefrom from the sheet 7 for use as desired. The material of our present invention also has a smooth surface or a surface which will give an intended effect to the material be it smooth or otherwise.

We have found that sheets 7 of cellulose acetate are admirably adapted for the purposes set forth. Glassine, coated with poly-vinyl alcohol or waterglass, or cellophane thus coated, and other materials are suitable for use as the sheets 7. The surface of the pattern, pattern parts, or sheet of pattern material which is to be applied to the model or other part, is preferably formed against the sheet 7 which, in addition to the other functions set forth, thereby protects such surfaces of the pattern, pattern parts, or sheet of pattern material and preserves the tacky, pressure or contact sensitive, pressure or contact sealing, and other properties thereof until used.

The patterns shown at 10 in Figure 3 are patterns for forming palatal or lingual bars for dental restorations. They are molded precisely as described in connection with Figures 1 and 2 to form exact reproductions of the cross sections of the bars to be cast and against a sheet 11 which corresponds with the sheet 7 shown in Figures 1 and 2. The patterns 10 are shown extending from one side of a connecting rib 12 which is formed of the pattern material and integrally connects the adjacent ends of the patterns 10.

In Figure 4 we have shown a sheet 14 of pattern material molded as described in connection with Figures 1 and 2, but between a pair of sheets 15 and 16, each of which corresponds with the sheet 7 shown in Figures 1 and 2. The sheet 14 of pattern material may be used in sheet form, or cut into strips or patterns or pattern parts, for use as will be presently described. In this case, the sheets 15 and 16 provide protection for both sides of the sheet 14 and serve not only to facilitate parting or separation of the pattern material from the mold or die, but for distribution and merchandising of the pattern material in sheet form in the manner described in connection with the preformed patterns of Figures 1, 2, and 3. We also contemplate applying sheets similar to the sheet 7 to both sides of the preformed patterns.

As described, the sheets 7, 11, 15, and 16, formed of cellulose acetate or the other materials set forth, not only preserve the surface of the preformed patterns and the surfaces of the sheet of pattern material, but also preserve the freshness of tack of the pattern material along the side which is applied, for example, to the model. In order to preserve the tack in the mixture we may add to the pattern material an anti-oxidant material to preserve the tack so that the material is good for use for many days. We have added propyl gallate. Many of the other normal anti-oxidants used in the rubber industry may be employed, usually reducing esters and acids. These materials are weather conditioning agents. Where employed, they are used in relatively small amounts—for example, from about 1/10% to about 1.0%.

Where we have referred to cold molding or compression of the pattern material between the die or mold parts at room temperature, or relatively cold, this applies particularly to the pattern material in sheet form, but may be applied to the preformed patterns, particularly by flash cold molding. The material according to our invention may be molded (1) by compression molding, (2) by transfer molding, (3) by extrusion molding, (4) by injection molding, or (5) by a combination of the above, as, for instance, extrusion followed by transfer molding.

In the use of the pattern material of the present invention the refractory model, shown at 20 in Figures 5, 6, and 7, is preferably dipped and coated with a material which will have an affinity for the improved pattern material and which will have tack or pressure or contact sensitive properties complementary with respect to the pattern material so that these materials will bleed together and actually chemically combine by contact, thereby effectively to join and seal the pattern to the model or different pattern parts to each other.

The material for dipping and coating the model 20 is capable of various modifications. One preferred example of such material is as follows:

*Dipcoat material—Example A*

Parts by weight
Modified alkyd resin (drop melt
  point 68°–75° C.)_____approximately 100
Hydrogenated rosin _____approximately 100
Terpene polymer resin_____approximately 75
Hydrogenated methyl ester
  of rosin_____approximately 25

The modified alkyd resin (drop melt point 68°–75° C.), the source of which has been previously pointed out, has a pressure or contact sensitive affinity for glass or ceramic materials and is used to cause the dipcoat to adhere to the model. It also causes or contributes a bleeding action between the dipcoat and the pattern material. It flows at about 110° C. The hydrogenated rosin or ester gum or rosin ester of medium flow point (about 120° C.) is used to render compatibility of pressure or contact sensitive tack to the pattern material. The terpene polymer resin is used as a flow agent or one which will give the material cold flow properties.

The dipcoat—Example A—is thinned by the hydrogenated rosin and hydrogenated methyl ester of rosin. It is compounded by adding the four materials together and compounding at a temperature from about 100° C. to about 130° C. It may be used or applied to the model 20, for example, by dipping the model in the dipcoat material for a few seconds at a temperature within the range referred to, preferably at a temperature of about 100° C. It is possible to use high melt or flow point dipcoats by emulsifying them and then using same as an emulsion. The manner in which the dipcoat material coats and penetrates into the refractory model 20 from the surface thereof is shown more or less diagrammatically at 21 in Figure 5.

The modified alkyd resin (drop melt point 68°–75° C.) and terpene polymer resin may be used alone as the dipcoat material for the model, although the flow point of such compound will be higher than the flow point of dipcoat—Example A. An example of a compound using modified alkyd resin (drop melt point 68°–75° C.) and terpene polymer resin alone is as follows:

*Dipcoat material—Example B*

Parts by weight
Modified alkyd resin (drop melt
  point 68°–75° C.)_____approximately 50
Terpene polymer resin_____approximately 50

Another satisfactory material possessing the requisite properties for the dipping and coating of the refractory model is as follows:

*Dipcoat material—Example C*

Parts by weight
2300 Micro-wax_____approximately 50
High melt point pale wood
  rosin _____approximately 50

The #2300 Micro-wax is a thermoplastic resinous material having a melting or flow point of about 155° F. The high melt point pale wood rosin is a rosin neutralized to have a relatively high melting or flow point of about 195° F. to about 200° F.

The dipcoats may be used in three ways; first, as a hot melt dip as above disclosed, in which case the model is merely dipped in the dipcoat for a few seconds whereupon it is allowed to cool; second, as a lacquer of solvent or drying oil type, in which case the dipcoat is applied cold and allowed to dry; and third, as an oil in water emulsion, in which case the dipcoat is rendered thin for use at room temperature. The lacquer and oil in water emulsion types may be used at room temperature, which is an advantage. After applying this type of dipcoat the emulsion is allowed to dry or break.

After applying the dipcoat to the model 20 the pattern material is applied by the simple expedient of placing it on the model and pressing it relatively slightly to the surface of the model. The pattern material, due to its pressure or contact sensitive property, will actually chemically combine with the dipcoat on the model. The pattern material and dipcoat have complementary tacks or pressure or contact sensitive and pressure or contact sealing properties, and bleed together effectively to join and seal the pattern material to the model or different pattern parts to each other by contact or relatively slight pressure which does not exceed that under which the pattern material will return to its desired contour.

The chemical or joining and sealing action assures that all portions of the pattern material placed against the model are effectively joined and sealed thereto. At the same time the bleeding, joining, and sealing action takes place relatively slowly, i. e., slow enough so that the pattern material may be stripped from the model if it is desired to change the position of the pattern material on the model, and this material is stripped from the model promptly after it is applied. After the pattern material has been in place on the model for a short period of time it becomes so firmly secured and sealed in place that it is practically impossible to strip it from the model.

In forming a pattern, for example, for a dental restoration as shown for purposes of illustration in Figures 5 to 8, inclusive, from preformed patterns, for example, as shown at 5 and 10 in Figures 1 to 3, inclusive, the first step is to dipcoat the model 20, as described. The configuration of the desired pattern may be pencilled on the model if desired, as well understood in the art.

After the dipcoat has cooled, dried, or been allowed to break, one of the pattern bars 10, for example, is stripped from the sheet 11 and cut or torn to length and placed upon the model and pressed into place to form, for example, the palatal bar 24 of the appliance. The clasp arms, rests, or the like, indicated in general at 25, may be formed of the same or other patterns, and applied in similar manner. The pattern 26 for the clasps which taper to their free ends are formed by stripping the desired clasp forming pattern 5 from the sheet 7 and applying same around the teeth 28 and to the other pattern parts in similar manner to form the pattern for the clasps of the appliance.

As shown in Figure 8, the clasp patterns 26, when applied about the tooth 28, are not only sealed in place by relatively slight pressure or contact, as before, but will actually follow depressions, such as indicated at 29, without destroying the desired tapered cross section of the clasp patterns. This is also true where the pattern material is applied to other depressions or irregular formations. Heretofore in flowing hot wax onto portions of the model or teeth which have such depressions or irregularities, the wax usually gets thicker in the depressions, which, of course, is highly objectionable.

If, in completing the pattern, it is desired to apply wax to the pattern or portions thereof, this may be done without distorting the pattern because of the higher softening temperature of the improved pattern material.

When the application of the pattern is completed it may be smoothed or flushed off by a flame, by radiant heat, or with a hot spatula or the like, or by dipping in a solvent such, for example, as ether, acetone, carbon tetrachloride or the like. The improved flaming properties of the pattern material, as previously set forth, produce substantially the smoothness of glass, without any objectionable degree of distortion, and dipping in a solvent provides even better uniformity of the pattern surfaces. If desired, the solvent may be toned down by adding butyl acetate, dibutyl ketone, or any such slower evaporating alcohol or ester or ketone.

Upon completing the pattern, it is invested in suitable investment material to form a refractory mold about the pattern, as well understood in the art. The entire refractory mold is then heated until all of the pattern material is completely burned out or eliminated, whereupon the metal or alloy is poured or otherwise introduced into the mold cavity and cast to shape. The alloy may be a high temperature fusing cobalt, chromium alloy, or any other suitable or preferred alloy or metal.

Where we refer herein to the use of copolymers of polyvinyl chloride, one suitable such copolymer that may be made sticky by painting an adhesive thereon or may be made sticky itself comprises polyvinyl chloride approximately 88% to approximately 98%, and polyvinyl acetate approximately 12% to approximately 2%.

Figure 10:
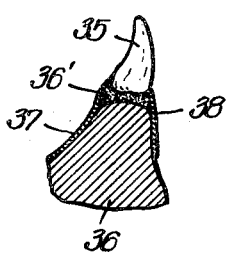
Figure 10 is a section view taken on the line 10—10 of Figure 9 showing the labial portion of the buccal and labial pattern applied to the model.
Figure 11:
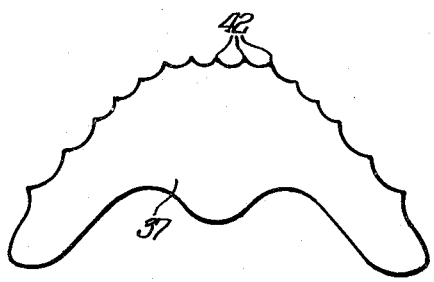
Figure 11 is a top plan view of the palate pattern shown in Figure 9.
Figure 12:
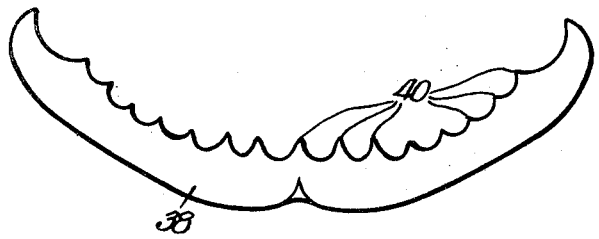
Figure 12 is a front elevational view of the buccal and labial pattern illustrated in Figure 9.

In using the patterns shown in Figures 9 to 12, inclusive, the teeth 35 are set up, for example, in wax or pattern material 36' on the model 36, and the palate pattern 37, and buccal and labial pattern 38, which are formed of the material of our present invention and applied as previously described, are applied to the model as shown in Figures 9 and 10.

The pattern 38 forms the outer surfaces of the gum contour and has the ridges 40, which fit between the teeth 35.

The pattern 37 forms the palate. It, likewise, has ridges 42 which fit between the teeth 35, and, when applied to the model, lends itself to accurate formation and maintenance in the pattern of the rugae or ridges on the palate part of the denture, as shown at 43 in Figure 9.

Upon completing the application of the patterns 37 and 38 to the model, the model, pattern parts, and teeth are invested to form a mold, as well understood in the art. The mold is then heated until all of the pattern material is washed out, whereupon the vulcanite, synthetic resin or porcelain is introduced and molded to shape and to the teeth 35. A refractory model or other article may be formed in similar manner.

A dye or coloring material may be dissolved or dispersed into the pattern material of our present invention in order to give the same color so that it may be used in the pattern forming process by color differentiation in the parts and for ease in application of the pattern materials.

Where the pattern material of our invention is of harder quality, it may be warmed or conditioned to bring it to the desired condition. For example, the initial hardness may be such as to permit convenient and ready handling, and this harder material may be rendered suitable for use by warming it, for example, with an electric light bulb, in an oven, with a heater pad or the like, to bring it to the desired tacky condition. It will remain in tacky condition for a matter of hours, after which it again assumes its original condition.

The pattern material of our present invention will take the operator's finger print and the print of the model, but, when released, returns to its glazy smoothness.

Different grades of hardness of the pattern material may also be used for our patterns, such as a harder material for a harder finishing line, rectangular bar or retention piece, or any such fine piece, so as to permit it to be handled easier when being placed on the built-up pattern. In other words, it may be to advantage to have the fine lines or fine pieces stiffer than the lingual and/or palatal bars so that they are not so pliable and stringy when the operator builds up the pattern.

A pliable and resilient non-tacky material, or almost non-tacky material may be used, to be adhered to the model, for example, by preparing the model to provide a tacky surface or a tack specific for the particular non-tacky or relatively non-tacky pattern to be applied thereto. It is likewise true that a greater hardness may be given to our patterns so that they are very dimensionally stable and can be pressed together, even though they are hard and fairly non-tacky, and they will bleed together.

We also contemplate using a flexible pattern of rubber or rubber-like material or other material which is pliable and suitable for the purpose, or a pliable resin or the like, and conditioning the contact surface of such patterns or applying a coating of suitable adhesive thereto so that, when pressed against either a prepared or unprepared model surface, they will adhere thereto.

The adhesive pressure sensitive property referred to herein and in the claims is one in which the pattern material is inherently adhesive and pressure sensitive relative to the surface to which applied or in which there is an actual chemical bonding of the pattern material to the surface due to the adhesive and pressure sensitive property of either the pattern material or the surface, or to the adhesive and pressure sensitive properties of both.

The embodiments of the invention shown in the drawing are for illustrative purposes only, and it is to be expressly understood that said drawing and the accompanying specification are not to be construed as a definition of the limits or scope of the invention, reference being made to the appended claims for that purpose.

We claim:

1. For application to dental models to form on the model a pattern for an article to be cast, a ready-made casting pattern of cross-sectional dimensions and shape corresponding generally to the cross-sectional dimensions and shape of the article to be cast and composed essentially of thermoplastic material having a surface which is non-setting, pressure-sensitive adhesive, said thermoplastic material being eliminatable by heat from refractory molds, and said pattern having sufficient elastic recovery from distortion with respect to cross-sectional dimension and shape so as not to become permanently distorted under pressures normally required for adhesion purposes.

2. For application to dental models, a ready-made denture clasp casting pattern, said pattern being of cross-sectional dimensions and shape corresponding generally to the cross-sectional dimensions and shape of the clasp to be cast and composed essentially of thermoplastic material having a surface which is non-setting, pressure-sensitive adhesive, said thermoplastic material being eliminatable by heat from refractory molds and said pattern having sufficient elastic recovery from distortion with respect to cross-sectional dimension and shape so as not to become permanently distorted under pressure normally required for adhesion purposes.

3. For application to dental models, a ready-made denture palatal bar casting pattern, said pattern being of cross-sectional dimensions and shape corresponding to the cross-sectional dimensions and shape of the palatal bar to be cast and composed essentially of thermoplastic material having a surface which is non-setting, pressure-sensitive adhesive, said thermoplastic material being eliminatable by heat from refractory molds, and said pattern having sufficient elastic recovery from distortion with respect to cross-sectional dimension and shape so as not to become permanently distorted under pressure normally required for adhesion purposes.

4. For application to dental models, a ready-made denture palate casting pattern, said pattern being of cross-sectional dimensions and shape corresponding generally to the cross-sectional dimensions and shape of the palate to be cast and composed essentially of thermoplastic material having a surface which is non-setting, pressure-sensitive adhesive, said thermoplastic material being eliminatable by heat from refractory molds, and said pattern having sufficient elastic recovery from distortion with respect to cross-sectional dimension and shape so as not to become permanently distorted under pressures normally required for adhesion purposes.

5. For application to dental models, ready-made buccal and labial casting patterns, said patterns being of cross-sectional dimensions and shape corresponding to the cross-sectional dimensions and shapes of the buccal and labial part to be cast and composed essentially of thermoplastic material having a surface which is non-setting, pressure-sensitive adhesive, said thermoplastic material being eliminatable by heat from refractory molds, and said pattern having sufficient elastic recovery from distortion with respect to cross-sectional dimension and shape so as not to become permanently distorted under pressures normally required for adhesion purposes.

6. The method of forming on a dental model a pattern for an article to be cast, which comprises, applying to said model a ready-made pattern of cross-sectional dimensions and shape corresponding generally to the cross-sectional dimensions and shape of the article to be cast and composed essentially of thermoplastic material having a surface which is non-setting, pressure-sensitive adhesive, said thermoplastic material being eliminatable by heat from refractory molds, and said pattern having sufficient elastic recovery from distortion with respect to cross-sectional dimension and shape so as not to become permanently distorted under pressure normally required for adhesion purposes.

7. The method called for in claim 6 wherein at least the surfaces of said model to which said ready-made patterns are to be applied are first coated with pressure sensitive adhesive coating material.

8. The patterns called for in claim 1 consisting essentially of rosin derivatives and ethyl cellulose.

9. The denture clasp patterns called for in claim 2 consisting essentially of rosin derivatives and ethyl cellulose.

10. The palatal bar patterns called for in claim 3 consisting essentially of rosin derivatives and ethyl cellulose.

11. The palate patterns called for in claim 4 consisting essentially of rosin derivatives and ethyl cellulose.

12. The buccal and labial patterns called for in claim 5 consisting essentially of rosin derivatives and ethyl cellulose.

13. A ready-made casting pattern for application to a model to form on the model a pattern for an article to be cast, said pattern being of cross-sectional dimensions and shape corresponding to the cross-sectional dimensions and shape of the article to be cast and composed essentially of thermoplastic material having a surface which is non-setting, pressure-sensitive adhesive, said thermoplastic material being eliminatable by heat from refractory molds, and said pattern having sufficient elastic recovering from distortion with respect to cross-sectional dimension and shape so as not to become permanently distorted under pressures normally required for adhesion purposes.

14. A ready-made casting pattern for application to a model to form on the model a pattern for an article to be cast, said pattern being of cross-sectional dimensions and shape corresponding to the cross-sectional dimensions and shape of the article to be cast and composed throughout of thermoplastic material having a surface which is non-setting, pressure-sensitive adhesive, said thermoplastic material being eliminatable by heat from refractory molds, and said pattern having sufficient elastic recovery from distortion with respect to cross-sectional dimension and shape so as not to become permanently distorted under pressures normally required for adhesion purposes.

15. For application to dental models for completion of details thereon of standardized cross-section and shape, ready-made patterns for said details, said patterns having standardized cross-sectional dimensions and shape and composed essentially of thermoplastic material having a surface which is non-setting, pressure-sensitive adhesive, said thermoplastic material being eliminatable by heat from refractory molds, and said pattern having sufficient elastic recovery from distortion with respect to cross-sectional dimension and shape so as not to become permanently distorted under pressures normally required for adhesion purposes.

16. A ready-made casting pattern of a character to be adhesively secured to a model to form on the model a pattern for an article to be cast, said pattern being preformed to cross-sectional dimensions and shape corresponding to the cross-sectional dimensions and shape of the article to be cast and consisting essentially of flexible plastic material eliminatable by heat from a refractory mold, and said pattern having sufficient flexibility to be adapted and conformed to the surface of the model and sufficient resistance to distortion with respect to cross-sectional dimensions and shape so as not to become permanently distorted under pressures normally required in adapting and conforming it to the surface of the model and for adhesion purposes.

17. A ready-made casting pattern according to claim 16, consisting essentially of rosin derivatives and ethyl cellulose.

18. In combination, a model having a surface to which a pattern is adapted to be applied, a ready-made casting pattern adhesively secured to the surface of the model to form on the model a pattern for an article to be cast, said pattern being preformed to cross-sectional dimensions and shape corresponding to the cross-sectional dimensions and shape of the article to be cast and consisting essentially of flexible plastic material eliminatable by heat from a refractory mold, said pattern having sufficient flexibility to be adapted and conformed to the surface of the model and sufficient resistance to distortion with respect to cross-sectional dimensions and shape so as not to become permanenly distorted under pressures normally required in adapting and conforming it to the surface of the model and for adhesion purposes, and said pattern having a surface for application against the surface of the model, at least one of the aforesaid model and pattern surfaces being of adhesive character whereby they are adhesively secured together.

19. In combination, a model having a surface to which a pattern is adapted to be applied, a ready-made casting pattern adhesively secured to the surface of the model to form on the model a pattern for an article to be cast, said pattern being preformed to cross-sectional dimensions and shape corresponding to the cross-sectional dimensions and shape of the article to be cast and consisting essentially of flexible plastic material eliminatable by heat from a refractory mold, said pattern having sufficient flexibility to be adapted and conformed to the surface of the model and sufficient resistance to distortion with respect to cross-sectional dimensions and shape so as not to become permanently distorted under pressures normally required in adapting and conforming it to the surface of the model and for adhesion purposes, and said pattern having a surface for application against the surface of the model, both the surface of the pattern and the surface of the model being of adhesive character whereby they are adhesively secured together.

REINER W. ERDLE.
CHARLES H. SCHAAR.

REFERENCES CITED

The following references are of record in the file of this patent:

UNITED STATES PATENTS

| Number | Name | Date |
|---|---|---|
| 1,359,919 | Reardon | Nov. 23, 1920 |
| 2,021,058 | Harrison | Nov. 12, 1935 |
| 2,057,289 | Birdlebough et al. | Oct. 13, 1936 |
| 2,296,877 | Slack, Jr. | Sept. 29, 1942 |
| 2,338,802 | Decker | Jan. 11, 1944 |
| 2,357,833 | Kropscott et al. | Sept. 12, 1944 |

Certificate of Correction

Patent No. 2,461,416                                                 February 8, 1949

REINER W. ERDLE ET AL.

It is hereby certified that errors appear in the printed specification of the above numbered patent requiring correction as follows:

Column 17, line 14, for the word "recovering" read *recovery*; column 18, line 18, for "permanenly" read *permanently*;

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*